Figure 7:
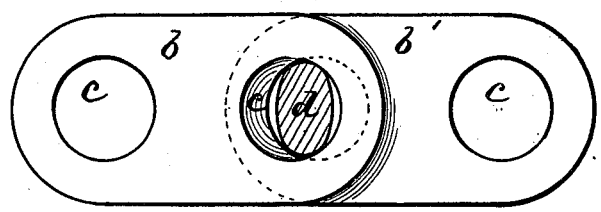

2 Sheets—Sheet 1.
J. B. WEST.
Machine for Setting Tires.
No. 200,637. Patented Feb. 26, 1878.
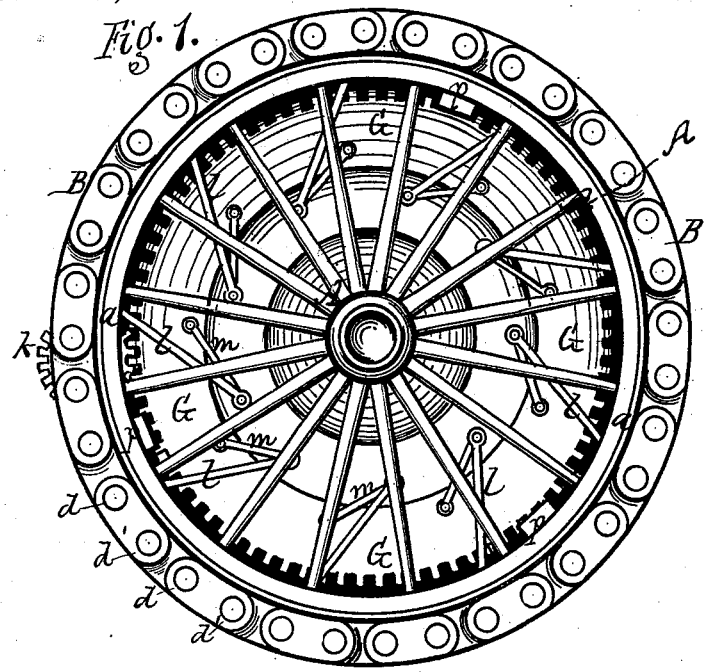
Fig. 1.
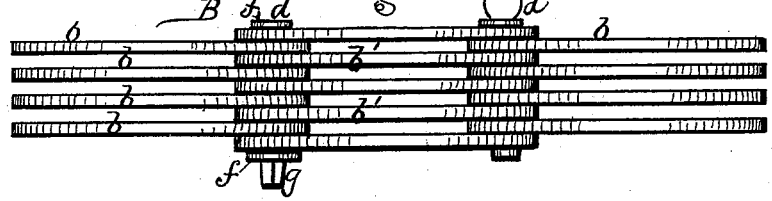
Fig. 2.
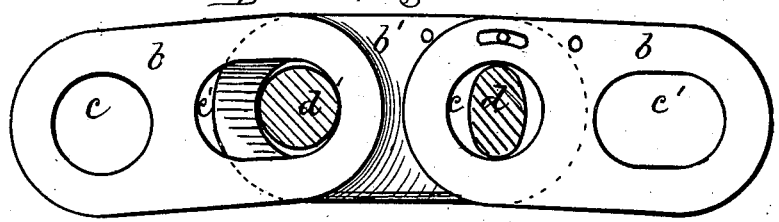
Fig. 3.
Fig. 4. Fig. 5. Fig. 6.
Attest.
R. F. Osgood
B. E. White
Inventor.
Jonathan B. West 2 Sheets—Sheet 2.

J. B. WEST.
Machine for Setting Tires.

No. 200,637. Patented Feb. 26, 1878.

Attest.
R. E. White
Jacob Spake

Inventor.
Jonathan B. West,
pr R. F. Osgood,
Atty.

UNITED STATES PATENT OFFICE.

JONATHAN B. WEST, OF GENESEO, NEW YORK.

IMPROVEMENT IN MACHINES FOR SETTING TIRES.

Specification forming part of Letters Patent No. 200,637, dated February 26, 1878; application filed March 10, 1877.

*To all whom it may concern:*

Be it known that I, JONATHAN B. WEST, of Geneseo, in the county of Livingston and State of New York, have invented a certain new and useful Improvement in Machines for Setting Tires; and I do hereby declare that the following is a full, clear, and exact description of the construction and operation of the same, reference being had to the accompanying drawings, in which—

Figure 1 is a plan of the machine applied to a wheel for compressing the tire on the same. Fig. 2 is a side elevation of a portion of the links composing the endless chain or band. Fig. 3 is a plan of a portion of the links, showing the pins and cams for connecting them and tightening them upon the wheel. Figs. 4, 5, 6, and 7 are detail views.

My improvement relates to those machines in the form of a chain or band which are placed around the wheel and tightened to compress the tire. Such machines are well known, and I lay no claim to such broadly.

My invention is in the nature of an endless chain or band made up of links, which are contracted by cams; and consists in the construction and arrangement of parts hereinafter more fully described and definitely claimed.

A represents the wheel upon which the tire is to be compressed, and $a$ is the tire. B is the endless chain or band. This chain is composed of a series of links or plates, $b\ b$ and $b'\ b'$. These links are in the form of flat plates, preferably steel, and the inner edges, or those which fit the tire, are slightly concave to meet the circle. The links are arranged in sets, as shown in Fig. 2, overlapping and breaking joints, so they may turn on pivots to bind the tire.

Each set of links has at one end a round hole, $c$, and at the other end an elongated slot, $c'$, Fig. 3, and the ends are so fitted that the round holes come in coincidence at one end of two sets of links and the slots at the other end, thus alternating in position. Through the round holes fit cams $d\ d$, and through the slots fit simple pins $d'\ d'$. If desired, the holes in both ends of the link may be made round, as shown in Fig. 7, those in which the pins fit answering the same purpose as the elongated ones, if made of sufficient size.

The cams are pins of oval form in cross-section and they have at top and bottom flanges or washers $f\ f$, the bottom ones being solid with the cams, while the top ones are attached by screws passing down into the ends of the cams. By this means the cams may be applied and removed. The washers serve to hold the links together.

When the cams are turned crosswise in the holes, as shown in Fig. 3, the links will be relaxed or extended, so as to allow the chain to be placed around the wheel; but when turned at right angles they draw the links together, thereby binding the chain upon the wheel.

The round holes are somewhat larger in diameter than the major axis of the cam which fits therein, so that when the cam is turned at right angles to the links, as shown in Fig. 7, the links can relax; but when the cam is turned in line with the links, then the opposite edges of the cam will bear against the edges of the holes and draw said links toward each other, thereby tightening the chain.

The throw of each cam is about one-eighth of an inch, and in an apparatus with forty-eight sets of links the drawing action will be about one and one-half inch—more than sufficient to compress any tire. If desired, cams might be used in all the joints of the links, dispensing with pins; but it is unnecessary to use so many.

The pins are employed to draw up the chain to the work in the initial movement, and before it is necessary to employ the power of the cams. The pins are simply dropped into the elongated slots. Where the take-up is small, small pins are used; but where it is considerable, larger pins are used, and the elongation of the slots allows greater or less movement to be made by the pins. In some cases the pins may be made in halves $y\ y$, as shown in Fig. 4, and they may be expanded by driving in a wedge, $w$. Slots concentric with the cam-holes may be made through the links, in which are inserted small pins, as shown at the top in Fig. 3, so that the several links composing the set cannot get out of place, but will be made to bear equally on the tire. Holes through the links may also be made, to insert pins to keep the links in place and together when disconnected.

For ordinary use in small shops, or individual use, the endless chain is applied around the wheel, and the cams are turned up by hand, in which case the wrench end $g$ of the cams is placed on top for convenience in applying the wrench; but in large shops, where much work is done, the wrench ends are placed downward, as shown in Fig. 2, and power applied by the following means: G is a spur gear or rim, mounted on a frame or block, which supports the chain. This gear receives motion by a pinion, $k$, or any equivalent means. $l\ l$ are arms having wrench-sockets, which fit over the wrench ends $g\ g$ of the cams. At the inner ends these wrench-arms are jointed to connecting-rods $m\ m$, jointed at the opposite end to the gear G. As the latter is turned the cams will be correspondingly turned by the arms $l\ l$, and the whole set of cams, or any desired number of them, are operated at one movement. The pressure of all the cams is thus made to bear at once on different parts of the circle, and great rapidity of action is produced. $p\ p\ p$ are rests for supporting the wheel. They are attached to the links, and project inward under the rim of the wheel, as shown. By this means the wheel is kept in proper position, and, the rests being attached midway to separate links, no obstruction can occur to the action of the chain.

The principal point in this invention is the construction of the chain or band in jointed links, with cams or other devices combined therewith at intervals, so as to apply the compressing-power at different points around the circle.

Heretofore, so far as I am aware, the chain or band has been made in a length, attached at one end and passing around the wheel, the power being applied at the other end, and the action being produced by drawing upon the band. In such case the action is very unequal, the greatest power being produced at one end, and, besides, the friction is very great, as the band has to move endwise as it compresses. In this invention all these difficulties are obviated, since the power is applied at many points, and the compression is therefore more uniform and effective.

Having thus described my invention, I do not claim, broadly, an endless chain made up of pivoted links, as I am aware such has been known, operated by a lever at the end; but

What I claim herein as new is—

1. In a machine for setting tires, the endless chain or band B, composed of links pivoted together, and provided with cams or equivalent compressing devices, arranged at intervals around the circle, and operating to produce compression of the chain or band upon the tire, as shown and described, and for the purpose specified.

2. In a machine for setting tires, the combination, with the links $b\ b$ composing the endless chain or band, of the cams $d\ d$, fitting in holes $c\ c$ of said links, and used either with or without the pins $d'\ d'$, as shown and described, and for the purpose specified.

3. In a machine for compressing tires, the combination, with the links $b\ b'$ composing the endless chain or band, and with cams $d\ d$ for operating the links, of the pins $d'\ d'$, fitting at intervals in the slots $c'\ c'$ of the links, for the purpose of adjusting the endless chain or band on the tire preparatory to applying the power, as herein shown and described.

4. In a machine for setting tires, the combination, with the links $b\ b$, provided with the holes $c'$, of the pins $d'$, made in halves, and the wedges $w$, fitting between the halves, and operating to draw the links in opposite directions when driven, as herein shown and described.

5. In a machine for setting tires, the combination, with the cams $d\ d$, of the jointed arms $l\ l$ and $m\ m$ and the gear or rim G, or equivalent, for producing simultaneous action of the cams, as and for the purpose specified.

6. In a machine for compressing tires, the combination, with the jointed links $b\ b$ composing the endless chain or band, of the rests $p\ p\ p$, projecting inward, and forming the supports for the wheel, as herein described.

In witness whereof I have hereunto signed my name in the presence of two subscribing witnesses.

JONATHAN B. WEST.

Witnesses:
  O. F. OSGOOD,
  R. E. WHITE.